United States Patent [19]

Onuki et al.

[11] Patent Number: 4,977,410

[45] Date of Patent: Dec. 11, 1990

[54] THERMAL LINE PRINTER WITH STAGGERED HEAD SEGMENTS AND OVERLAP COMPENSATION

[75] Inventors: Hideki Onuki; Masaki Denda, both of Tokyo, Japan

[73] Assignee: Seiko Instruments Inc., Japan

[21] Appl. No.: 407,407

[22] Filed: Sep. 14, 1989

[51] Int. Cl.[5] ....................... G01D 15/10; B41J 2/345; B41J 2/355

[52] U.S. Cl. ................................ 346/76 PH; 400/120

[58] Field of Search .................... 346/76 PH; 400/120

[56] References Cited

U.S. PATENT DOCUMENTS 4,660,052 4/1987 Kaiya ............................ 346/76 PH

*Primary Examiner*—Bruce A. Reynolds
*Assistant Examiner*—Scott A. Rogers
*Attorney, Agent, or Firm*—Bruce L. Adams; Van C. Wilks

[57] ABSTRACT

A thermal line printer line-sequentially prints dots on a recording medium in horizontal and vertical directions according to bit data. A line thermal head includes a plurality of linear head segments arranged in a pair of parallel rows along the horizontal direction in staggered relation to each other such that the head segments partly overlaps through different relative displacements with each other between the rows. Each of the head segments has a plurality of heating elements disposed linearly along the segment, and effective to print dot according to image bit data and ineffective to print dot according to blank bit data. A feeding device line-sequentially feeds a recording medium relative to the line thermal head in the vertical direction. A designating circuit operates according to the different relative displacements for designating effective and ineffective sections adjacently with each other to the respective head segments such that the designated effective sections are successively connected to each other in the horizontal direction without irregular overlapping and spacing. An assigning circuit operates during each line-sequential printing for assigning image bit data to heating elements within the effective sections and blank bit data to heating elements within the ineffective sections to thereby effect regular dot printing along each line.

10 Claims, 4 Drawing Sheets

FIG. 3A
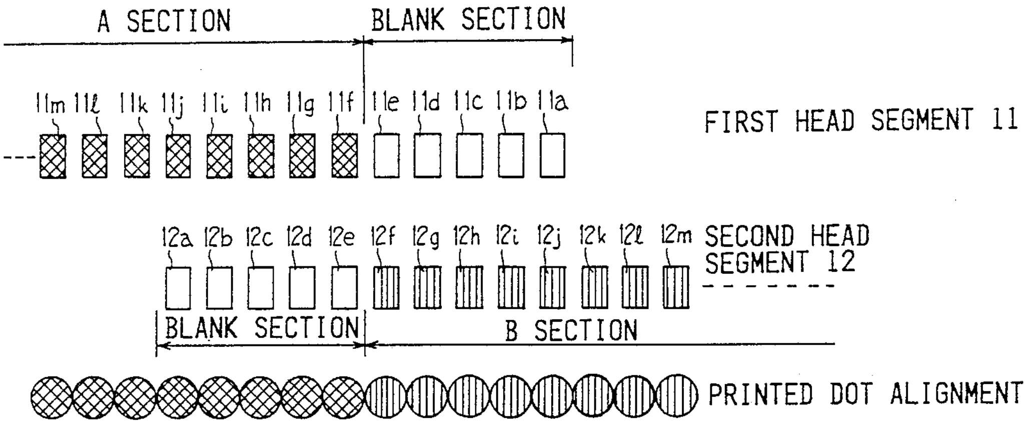
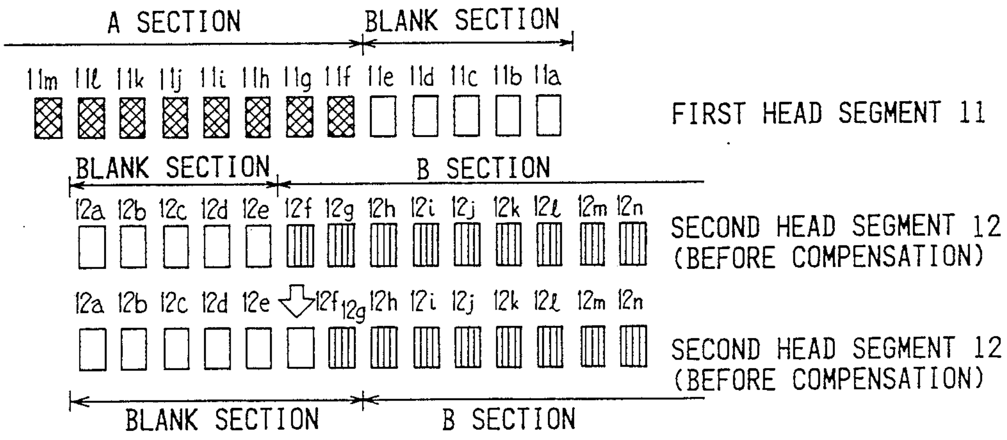
FIG. 3B

FIG. 6A
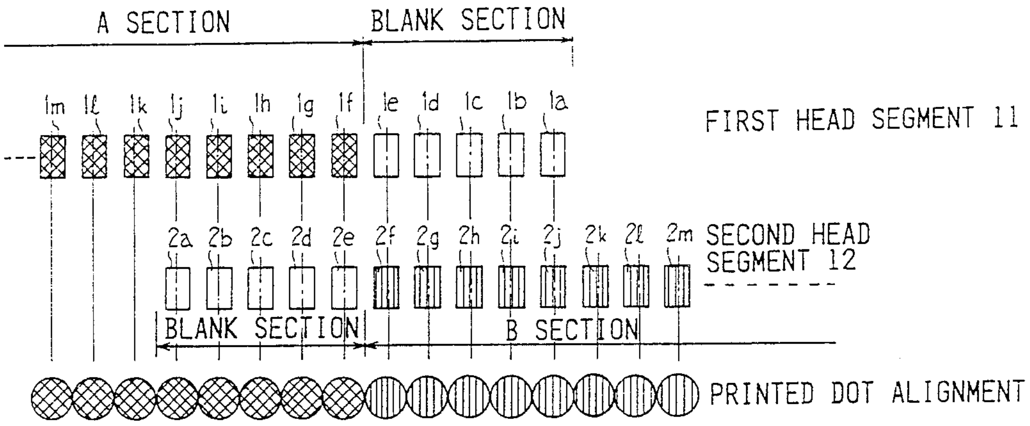
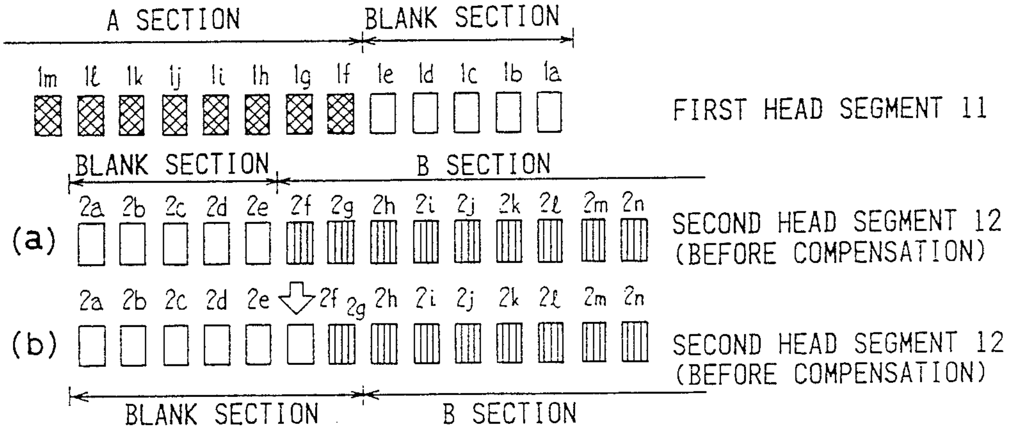
FIG. 6B

THERMAL LINE PRINTER WITH STAGGERED HEAD SEGMENTS AND OVERLAP COMPENSATION

BACKGROUND OF THE INVENTION

The present invention relates to a thermal line printer of the type having a divided line head composed of a plurality of linear thermal head segments aligned in the widthwise direction of a recording medium sheet perpendicular to the feeding direction or the lengthwise direction of the recording medium sheet so as to cover the entire span or width of the recording medium sheet.

One type of conventional divided line head is composed of a plurality of linear thermal head segments aligned in a single row and coupled to each other at opposed ends of adjacent segments. Each linear segment has a given length sufficient to cover the span of A4 or B4 size recording paper and is formed with a plurality of heating elements arranged linearly on the segment at a given pitch. These linear head segments are connected in series to each other to constitute the divided line head which can cover the entire length of larger size recording paper such as A1 size and A0 size, and which has a higher yield rate than that of a corresponding monolithic line head of comparative length.

However, this type of conventional divided line head has drawback that the pitch of the heating elements is made irregular along the junction or connecting portion of adjacent segments to thereby impair the quality of the printed image pattern.

Another type of conventional divided line head is disclosed in U.S. Pat. No. 4,660,052. This conventional head is composed of a plurality of linear thermal head segments aligned in a pair of parallel rows in staggered relation and in partially overlapping relation at end portions of the linear segments between the parallel rows so as to completely cover the entire width of recording paper. In operation, the first or upstream row of linear segments is activated to effect a part of the single line printing, and then the second or downstream row of linear segments is shifted in the lengthwise direction of recording paper relative thereto through an interval corresponding to the distance between the parallel rows and is activated to effect the remaining part of the single line printing to thereby complete the single line printing. In such operation, in order to avoid duplicate printing by the overlapping portion of the staggered segments between the first and second rows, a predetermined number of heating elements are blanked during the printing operation at the overlapping portion of the staggered linear segments. The staggered linear segments must be precisely positioned relative to each other to set a predetermined overlapping dimension corresponding to the span of the predetermined number of the blanked heating elements. However, it is practically quite difficult to precisely and equally set the overlapping dimension of the individual staggered segments between the pair of rows due to positioning error during assembling of the divided line head and due to thermal expansion of the linear segments caused during the continuous printing operation.

SUMMARY OF THE INVENTION

In view of the above noted drawbacks of the conventional staggered thermal line head, an object of the present invention is to compensate the positional error of the staggered arrangement of linear segments.

Another object of the present invention is to electrically measure the positional error of individual linear segments and to determine individually a number of heating elements to be blanked based on the measurement.

A further object of the present invention is to adjust a number of heating elements to be blanked according to body temperature of the line head so as to compensate for relative thermal expansion between the individual segments.

BRIEF DESCRIPTION OF THE DRAWINGS

FIGS. 3A and 3B are schematic diagrams illustrating the operation of the FIG. 1 embodiment;

FIGS. 6A and 6B are schematic diagrams illustrating the operation of the FIG. 5 embodiment.

DETAILED DESCRIPTION OF EMBODIMENTS

Figure 1:
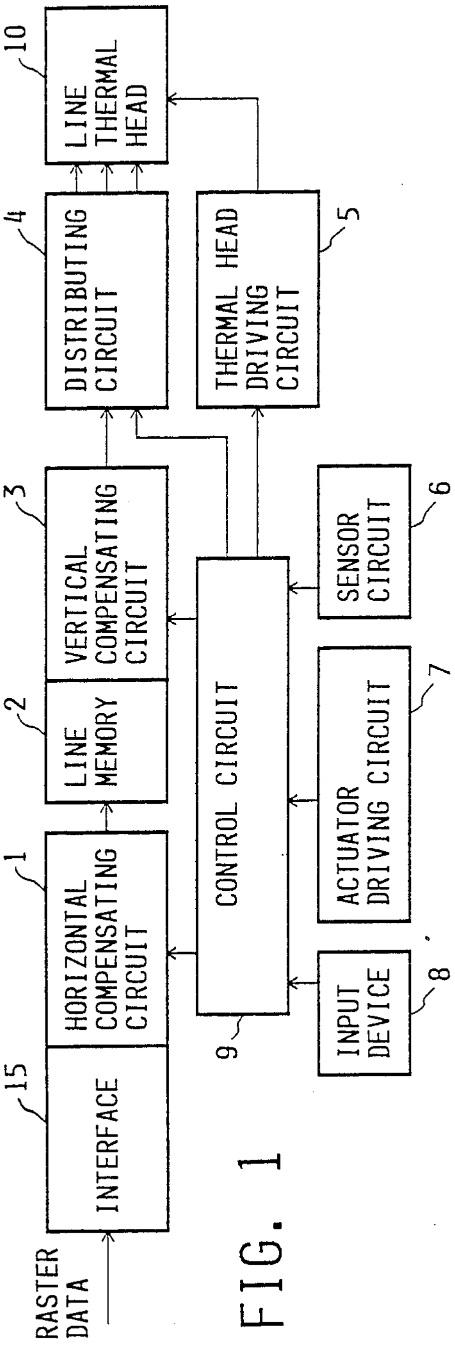
FIG. 1 is a block diagram showing one embodiment of the thermal line printer.

FIG. 1 is a block diagram showing one embodiment of the line thermal printer according to the present invention. The printer is comprised of an actuator driving circuit 7 for driving various actuators including a feeding motor for effecting the feeding of a recording paper in a vertical direction. A sensor circuit 6 is comprised of an encoder for detecting a feeding amount of the recording paper to produce a detection signal, an A/D converter for effecting A/D conversion of the detection signal and an interface to a control circuit 9 which controls the recording paper feeding according to an output signal from the sensor circuit 6. The control circuit 9 further controls a widthwise or horizontal compensating circuit 1, a lengthwise or vertical compensating circuit 3, a bit data distributing circuit 4, and a thermal head driving circuit 5. The widthwise compensating circuit 1 includes an interface for receiving raster data containing image bit data and converted from a vector signal by a controller in a host computer (not shown), and operates to divide the raster data in the widthwise or horizontal direction of the recording paper correspondingly to heating elements of a line thermal head 10 and to assign blank bit data to some of the heating elements of linear head segments other than those effecting image dot printing. The lengthwise compensating circuit 3 includes a line memory 2 for storing bit data fed from the widthwise compensating circuit 1, and operates to generate blank bit data corresponding to a vertical gap between a pair of rows of the head segments arranged in staggered relation. The line memory 2 operates to store the image bit data and the blank bit data to be assigned to heating elements of the thermal head 10 (in this embodiment, the line memory 2 stores bit data corresponding to 1280 number of lines). The distributing circuit 4 distributes the bit data stored in the line memory 2 to the heating elements of the thermal head 10, which are common-divided into small groups, for example, eight groups such that the divided heating elements are concurrently activated within each group. The driving circuit 5 drives the thermal head 10 according to a printing timing signal generated in synchronization with the vertical feeding of the recording paper.

Further, the control circuit 9 operates according to a command signal inputted manually through an input device 8 by an operator and representative of a compensative amount for printing error on the recording paper so as to adjust the blank bit data to control the horizontal and vertical compensating circuits 1 and 3 to thereby compensate for the positional error of the printed dots.

Figure 2:
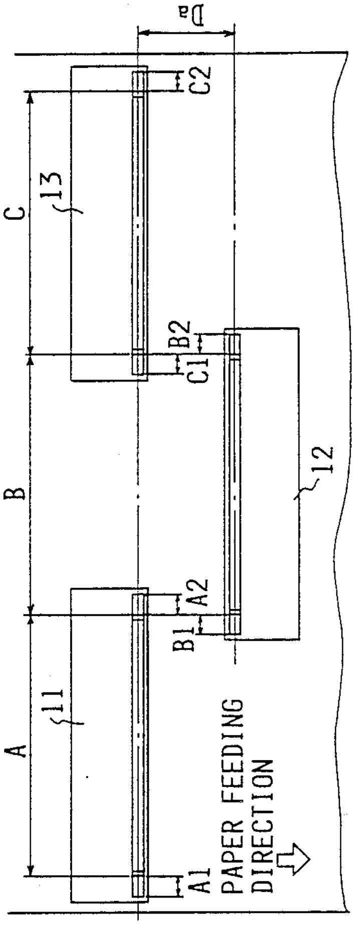
FIG. 2 is a plan view of a line thermal head.

FIG. 2 shows the arrangement of linear head segments in the line thermal head 10. Three linear segments 11 to 13 are arranged in staggered relation along a pair of parallel rows. The segments 11 and 13 are disposed along the upstream row and the segment 12 is disposed along the downstream row between the segments 11 and 13 in partially overlapping relation thereto. The pair of rows are spaced from each other a given distance or gap D in the feeding direction. The first segment 11 has a plurality of heating elements linearly arranged on the segment and is divided into marginal end portions or sections A1 and A2 and an intermediate effective portion or section A. The second segment 12 is similarly divided into marginal end portions B1 and B2 and an intermediate portion B. The third segment 13 is also divided into marginal end portions C1 and C2 and an intermediate portion C. The marginal sections A2 and B1 are overlapped with each other in the horizontal direction, and the marginal sections C1 and B2 are overlapped with each other in the horizontal direction.

The horizontal compensating circuit 1 assigns one line of the raster bit data dividedly to the respective intermediate sections A, B and C and assigns blank bit data to a part of the heating elements which are positioned in the marginal sections A1 through C2 and which are duplicative between the upstream and downstream rows. The bit data are stored in the line memory 2 line by line.

FIG. 3A shows one example of assignment of image and blank bit data to the heating elements of the head 10. In the first segment 11 containing heating elements 11*a*,11*b*, ---, the heating elements 11*f*, 11*g*, ---, are assigned with image bit data in the effective section A, and the remaining heating elements 11*a*, 11*b*, 11*c*, 11*d* and 11*e* are assigned with blank bit data in the marginal section A2 so as to avoid duplicate printing of dots with respect to the second segment 12. In similar manner, in the second segment 12, the heating elements 12*f*, 12*g*, ---, are assigned with image bit data in the effective intermediate section B, and the remaining heating elements 12*a*, 12*b*, 12*c*, 12*d* and 12*e* are assigned with blank bit data in the marginal section B1. The similar assignment of blank bit data is carried out for the other overlapping marginal sections. As a result of such assignment of blank bit data, the dots are printed along one line without duplicate printing as shown in FIG. 3A.

The initial assignment of the blank bit data is automatically carried out according to a predetermined program. However, normally the assignment error is observed in the individual staggered arrangement of the head segments when actually assembled into the printer due to alignment error of the thermal head and mechanical working error thereof etc.

In such case, the initial assignment error can be corrected electrically without effecting mechanical adjustment as shown in FIG. 3B. Namely, in case that the second head segment 12 is dislocated further in the leftward horizontal direction relative to the first head segment 12 by a displacement corresponding to a span of two heating elements 12*f* and 12*g* from the standard position shown in FIG. 3A, the heating elements 12*f* and 12*g* are assigned with blank bit data effective to compensate for the relative dislocation of staggered segments. Practically, the operator can recognize such relative dislocation from the actually printed irregular line arrangement of dots so that the operator can manually input a command signal indicative of the compensative number of heating elements into the input device 8 such as a key board and control panel. The control circuit 9 operates according to the inputted command signal to control the horizontal compensating circuit 1 to change the assignment of blank bit data and to store the updated blank bit data in the line memory 2. As a result, the two heating elements 12*f* and 12*g* are switched from effective image bit data to ineffective blank bit data as shown in FIG. 3B. At the same time, the initial assignment of image bit data to the intermediate section B is shifted rightward by two bits due to the insertion of two blank bit data, and corresponding deletion of blank bit data is effected in the opposite marginal end section B2 so as to balance with the insertion of blank bit data into the marginal end section B1. Similar updating operation of the blank bit data can be effected independently for the respective marginal sections A1 through C2. Moreover, the starting position of the line printing can be adjusted according to reassignment of blank bit data.

Figure 4:
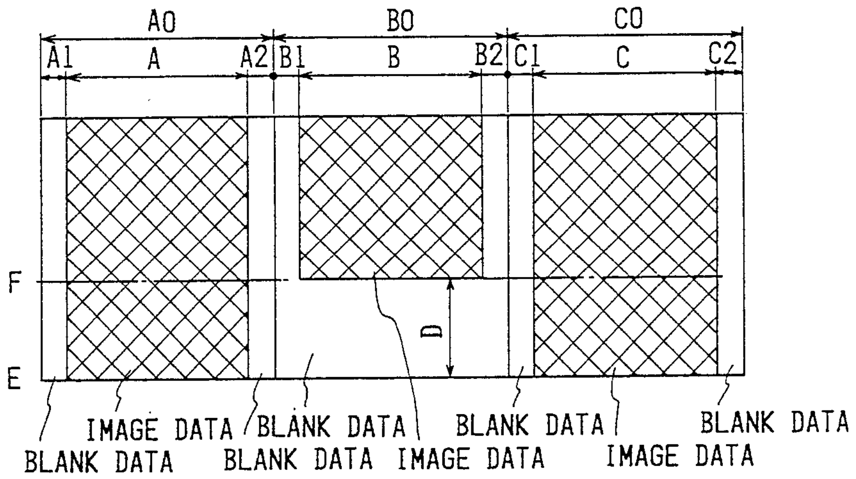
FIG. 4 is a schematic memory map.

FIG. 4 shows a memory map of bit data stored in the line memory 2 shown in FIG. 1. The line memory 2 stores image bit data divided into effective sections A, B and C of the map corresponding to the head segments 11, 12 and 13 and assigned by the horizontal compensating circuit 1, and stores blank bit data in ineffective marginal sections A1 through C2 of the map. By changing the area dimension of the marginal sections, the image bit data sections A, B and C are shifted and the starting position of line printing can by adjusted. However, for example, if the inserted number of blank bit data is too much for the marginal section B1, the total number of bit data can not be assigned within the entire area of segment 12 which is $B0=B1+B+B2$. In case of the FIG. 3B condition, only two blank bit data are additionally assigned to the heating elements 12*f* and 12*g* and the image bit data are shifted by two bits. However, if the added compensative number of blank bit data are too much, the shift amount of image bit data is correspondingly increased to cause overflow in the memory. According to the present invention, in order to avoid such overflow, the control circuit 9 operates according to the needed number of blank bit data to control the horizontal compensating circuit 1 to adjustably divide the raster data so as to assign adjustably the divided image bit data to the respective head segments.

Next, the compensative operation is also effected in the vertical direction or the paper-feeding direction. As shown in FIG. 2, the linear head segments 11, 12 and 13 are arranged in the staggered relation along the pair of parallel rows a spaced distance D. A platen, paper guide and line thermal head are disposed between the spacing between the upstream and downstream rows within the spaced distance D which would cause vertical dislocation of printed dots. According to the present invention, the vertical compensating circuit 3 shown in FIG. 1 operates to generate blank bit data corresponding to the spaced distance D, and the line memory 2 stores the thus generated blank bit data in the section D of the map as shown in FIG. 4, effective to compensate for the vertical dislocation. For example, in the present embodiment, the line memory 2 has a memory area of 1280 number of lines, and the vertical compensating circuit 3 generates blank bit data corresponding to 360 number of lines so as to meet the needed compensative amount for the vertical dislocation. In addition, the used thermal head segment has a linear printing density of 12 dots/mm for the heating elements, and therefore the spaced distance D or vertical dislocation is set to 30 mm between the pair of rows.

Referring back to FIG. 4, the vertical compensative operation will be explained when effecting sequentially the line printing throughout the entire width of the recording paper. When the memory 2 is addressed at a starting line position E on the memory map, the thermal head 10 is started by the driving circuit 5 such that the heating elements in the effective section A of head segment 11 and in the effective section C of head segment 13 are activated according to image bit data distributed thereto from the memory 2, while the sensor circuit 6 continuously produces the synchronizing signal (printing timing signal) in response to the vertical feeding of the recording paper and the control circuit 9 operates according to the synchronizing signal to sequentially address the line memory 2. During this operation, since the memory 2 is stored with blank bit data in the section B0 of the map, the head segment 12 does not effect the printing of dots. When the address of line memory 2 reaches a subsequent position F on the map in response to the sequential printing timing signal, the second thermal head segment 12 starts to carry out dot printing because the advancement amount of the recording paper reaches the spaced distance D. At the same time, the control circuit 9 recognizes according to the output signal from the sensor circuit 6 the fact that the printing paper has actually advanced through a pass corresponding to the spaced distance D so as to control the thermal head segments 11, 12 and 13 concurrently to effect the dot printing by the heating elements in the effective sections A, B and C. Consequently according to such programed printing operation, the printer can effect sepuentially the line printing with substantially perfect regular linear alignment of printed dots throughout the entire width of the recording paper.

The vertical compensating circuit 3 initially generates a predetermined number of blank bit data corresponding to a designed spacing D between the pair of rows. However, in similar manner as in the horizontal compensation, the vertical compensation is also needed due to actual vertical error with respect to the designed spacing. In this case, the vertical compensating circuit 3 operates according to a command signal inputted through the input device so as to generate the compensative blank bit data in the vertical direction.

. As described above, according to the present invention, the relative dislocation of the head segments is electrically corrected independently in either of the horizontal and vertical directions to thereby prevent printing error of dots. The inventive line head has staggered linear segments each having the length matching A4 or B4 size of paper so as to constitute a very long thermal head which can cover A1 or A0 size of paper without dot printing error or misalignment thereof, thereby providing an improved thermal printer having moderate price and high quality. The present invention can be applied to a thermal transfer printer having a line head.

Figure 5:
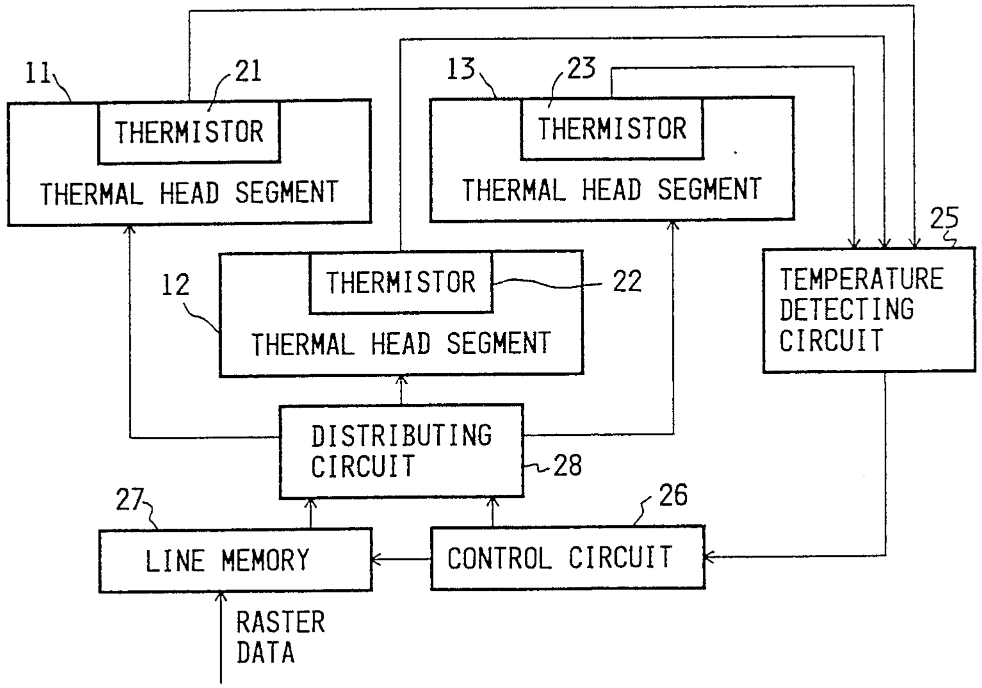
FIG. 5 is a block diagram showing another embodiment of the thermal line printer.

FIG. 5 is a block diagram showing another embodiment of the thermal printer according to the present invention, effective to compensate for the relative thermal expansion between the linear head segments. The printer includes a line thermal head composed of three linear thermal head segments 11, 12 and 13 arranged in staggered relation. The segments 11, 12 and 13 are attached with thermistors 21, 22 and 23, respectively, effective to detect the body temperature of the corresponding head segments. The thermistors 21, 22 and 23 produce a temperature signal based on their detection, and a temperature detection circuit 25 carries out A/D conversion of the temperature signal into corresponding temperature data. A control circuit 26 operates according to the inputted temperature data to determine or designate effective printing sections of the respective linear head segments 11, 12 and 13 so as to avoid irregular printing of dots along a line, such as duplicate printing and separate or spaced printing at a coupling zone between the staggered segments. On the other hand, a line memory 27 stores transferred raster data, bit by bit, representative of the image to be printed. The line memory 27 transfers the stored raster data to a distributing circuit 28 according to a command signal fed from the control circuit 26. The distributing circuit 28 operates according to the determination or designation made in the control circuit 26 to distribute dividedly image bit data contained in the raster data and blank bit data to the respective head segments to thereby drive the thermal head to effect sequential line printing of the inputted image.

As shown in FIG. 2, the three head segments 11, 12 and 13 are arranged in staggered relation such that the heating elements of the first and third segments 11 and 13 are aligned along the identical line in the horizontal direction, and the heating elements of the second segments 12 are aligned linearly in parallel to those of the first and second segments. Further, the end section A2 of the first segment 11 is overlapped with the adjacent end section B1 of the second segment 12 in the horizontal direction, and the other end section B2 of the second segment 12 is overlapped with the adjacent end section C1 of the third segment 13 in the horizontal direction. The respective thermal head segments 11, 12 and 13 are composed of a longitudinal ceramic substrate formed with a plurality of the linearly arranged heating elements. Each of the respective ceramic substrates is fixed at its middle point to a thermal head base, such that the respective ceramic substrate undergoes linear thermal expansion in both directions due to generated heat. The effective printing section of the respective head segments must be compensated for the thermal expansion of the ceramic substrate in order to effect the normal and regular printing of dots along line. The thermistors 21, 22 and 23 are attached to the respective head segments to measure the temperature of the ceramic substrates.

As shown in FIG. 2, the respective effective printing sections A, B and C of the head segments 11, 12 and 13 have the same linear dimension L along the horizontal direction. Provided that an origin point is set at a center of the second thermal head segment 12 at which the ceramic substrate thereof is fixed to the head base, the matching state of printed dot linear alignment at the connecting or junction portion between the staggered head segments 11 and 12 is determined by the degree of linear thermal expansion of the ceramic substrate of segment 12 between the origin point and the one end point thereof, and of the other ceramic substrate of segment 11 between the center point thereof and the one end point thereof adjacent to the one end point of the segment 12. Now, the linear variation of the junction portion between the first and second segments 11 and 12 is denoted by X, and X is set positive when the linear variation causes the duplication of the printed dots and set negative when the linear variation causes the separation of the printed dots at the junction portion. The linear variation X is represented by the following relation:

$$X=\alpha L(T'_1-T_1)/2+\alpha L(T'_2-T_2)/2$$

where $\alpha$ represents linear thermal expansion rate, $T_1$ represents optimum body temperature of the first segment 11 at which the best or designed matching condition of printed dots is obtained, $T_2$ represents optimum body temperature of the second segment 12 at which the best or designed matching condition of printing dots is obtained, $T'_1$ represents current body temperature of the first segment 11, and $T'_2$ represents current body temperature of the second segment 12. The first term of the relation indicates the expansion or contraction amount of the first segment 11, and the second term indicates the expansion or contraction amount of the second segment 12. Further, the compensation for the variation due to thermal expansion is effected digitally in terms of a number of dots to be shifted linearly. Thus, the compensative or corrective dot number Y is represented by the following relation:

$$Y=X/\beta$$

where $\beta$ is linear resolution of the thermal head, and the value of $X/\beta$ is approximated to the nearest integer Y.

Referring to FIGS. 6A and 6B, the compensative operation is explained for the linear variation due to the thermal expansion, FIG. 6A shows the designed or ideal position of the staggered first and second segments 11 and 12 and matched alignment of the printed dots. In this situation, the last dot printed by the first segment 11 and the first dot printed by the second segment 12 are adjacently and linearly arranged at regular pitch without mismatching or dislocation such as overlapping to each other or separating from each other at the junction portion therebetween. Then, when starting the line-sequential printing operation, the body temperature of the head segments is increased such that the head segments undergo their linear expansion.

FIG. 6B shows the current position of the second head segment 12 relative to the first head segment 11. The second head segment 12 is displaced leftwardly relative to the first head segment 11 due to thermal expansion. As a result, the two heating elements 12*f* and 12*g* the preset effective section B of the second segment 12 overlap with the last two heating elements 11*g* and 11*f* in the preset effective section A of the first segment 11. In order to compensate this overlapping condition, the preset effective section B is shifted leftward by two bits to establish current matching condition.

In operation, the thermistors 21 and 22 detect the current temperature of the thermal head sections 11 and 12, respectively. The detected results are converted into the corresponding temperature data by means of the detection circuit 25. The control circuit 26 operates based on the temperature data to calculate the linear variation X due to relative expansion of the segments 11 and 12 according to the above described relation, and further to calculate the compensative dot number Y. The control circuit 6 produces a shift command effective to shift the effective printing section B of the segment 12 in the horizontal direction according to the sign of the value Y and the magnitude thereof. For example, in case of the FIG. 6B situation, the effective printing section B is shifted rightward by two bits as shown by the bottom portion of FIG. 6B.

The distributing circuit 28 receives the shift command and the raster data fed from the line memory 27. The distributing circuit 28 distributes the raster data to the respective segments 11, 12 and 13.

In the starting of the printing operation, the raster data is distributed and assigned bit by bit to the individual heating elements according to the preset program as shown in FIG. 6A. At this time the last five heating elements 11*e*, 11*d*, 11*c*, 11*b* and 11*a* of the first head segment are assigned with blank bit data ineffective to enable dot printing, and the first five heating elements 12*a*, 12*b*, 12*c*, 12*d* and 12*e* of the second head segment 12 are assigned with blank bit data.

Then, during the printing operation, the head segments 11 and 12 undergo thermal expansion to cause relative linear dislocation of the heating elements by two bits as shown in FIG. 6B. The distributing circuit 28 operates according to the shifting command from the control circuit 26 to shift the distribution of the image bit data by two bits in the rightward direction such that the first effective heating element is shifted from 12*f* to 12*h*. At the same time, the distributing circuit 28 distributes the blank bit data additionally to the currently ineffective heating elements 12*f* and 12*g*. As described above, effective printing sections A, B and C can be shifted according to the positional variation of the staggered head segments 11, 12 and 13, and the image bit data are dividedly distributed to the shifted effective sections so as to carry out the line printing of image dots connected regularly at the junction portions.

The above described relations are specific to the perticular structure of the thermal head, and therefore are altered for a different structure of the thermal head. The thermistors are utilized in the above embodiment; however, other types of thermo-electro conversion elements can be used for detecting the body temperature of the thermal head segments.

As described above, according to the present invention, the dislocation of the periodical arrangement of printed dots at the junction portions of staggered head segments due to their thermal expansion is automatically compensated so as to limit the irregularity of the dot arrangement at the junction portions, such as overlapping or spacing, within half pitch of the periodical dot arrangement. Therefore, the head segments of relatively short size (A4 or B4 size) can be coupled in staggered relation to constitute the line thermal head of relatively long size (A1 or A0 size) having high accuracy and high printing quality.

Moreover, the relative linear variation of the staggered head segments ranges from 0.1 mm to 0.3 mm due to the thermal expansion. Such variation would impair the regularity or continuity of the printed dots at the junction portion in the conventional line thermal printer. For example, the variation of 0.2 to 0.3 mm corresponds to 4 or 5 number of dots in the line printer having the resolution of 16 dots/mm. According to the invention, such variation can be compensated within half pitch of the periodical arrangement of dots, thereby providing a quite precise high resolution line dot thermal printer.

What is claimed is:

1. A thermal line printer for line-sequentially printing dots on a recording medium in horizontal and vertical directions according to bit data, comprising:

a line thermal head including a plurality of linear head segments arranged in a pair of parallel rows along the horizontal direction in staggered relation to each other such that the head segments partly overlap through different relative displacements with each other between the rows, each of the head segments having a plurality of heating elements disposed linearly along the segment, the heating elements being effective to print dots according to image bit data and being ineffective to print dots according to blank bit data;

feeding means for line-sequentially feeding a recording medium relative to the line thermal head in the vertical direction;

designating means operative according to the different relative displacements for designating effective and ineffective sections adjacently with each other to the respective head segments such that the designated effective sections are successively connected to each other in the horizontal direction without irregular overlapping and spacing, the designating means including input means for manually inputting command data representative of actual relative displacements between the staggered head segments, and shifting means for shifting the designation of the effective and ineffective sections so as to adjust for the actual relative displacements; and assigning means operative during each line-sequential printing for assigning image bit data to heating elements within the effective sections and blank bit data to heating elements within the ineffective sections to thereby effect regular dot printing along each line.

2. A thermal line printer according to claim 1; wherein the assigning means includes means operative during the line-sequential printing operation in the vertical direction for assigning blank bit data to heating elements of a head segment arranged in one of the parallel rows positioned downstream of the vertical feeding of the recording medium so as to compensate for a parallel gap between the pair of upstream and downstream rows.

3. A thermal line printer for line-sequentially printing dots on a recording medium in horizontal and vertical directions according to bit data, comprising:

a line thermal head including a plurality of linear head segments arranged in a pair of parallel rows along the horizontal direction in staggered relation to each other such that the head segments partly overlap through different relative displacements with each other between the rows, each of the head segments having a plurality of heating elements disposed linearly along the segment, the heating elements being effective to print dots according to image bit data and being ineffective to print dots according to blank bit data;

feeding means for line-sequentially feeding a recording medium relative to the line thermal head in the vertical direction;

designating means operative according to the different relative displacements for designating effective and ineffective sections adjacently with each other to the respective head segments such that the designated effective sections are successively connected to each other in the horizontal direction without irregular overlapping and spacing, the designating means including detecting means operative during continuous printing operation for detecting the body temperature of the respective head segments, calculating means for calculating variation of the expansion of the head segments according to the detected body temperature thereof, and shifting means for shifting the designation of the effective and ineffective sections according to the calculation result so as to compensate for the variation of the relative displacements; and assigning means operative during each line-sequential printing for assigning image bit data to heating elements within the effective sections and blank bit data to heating elements within the ineffective sections to thereby effect regular dot printing along each line.

4. A thermal line printer according to claim 3; wherein the assigning means includes means operative during the line-sequential printing operation in the vertical direction for assigning blank bit data to heating elements of a head segment arranged in one of the parallel rows positioned downstream of the vertical feeding of the recording medium so as to compensate for a parallel gap between the pair of upstream and downstream rows.

5. An apparatus for line-sequentially recording data on an advanceable recording medium comprising: a plurality of thermal head segments arranged in two parallel rows which are spaced from one another in the direction of advancement of the recording medium and which extend parallel to one another in a direction transverse to the advancing direction, the thermal head segments in the two rows being staggered in the transverse direction in overlapping relation relative to one another to enable the thermal head segments in both rows to jointly and sequentially effect line recording of data on the recording medium as the recording medium advances in the advancing direction; and means for electrically compensating for the extent of overlap of each two overlapping thermal head segments to effect sequential line recording of data on the recording medium without irregular overlapping and spacing of the recorded data.

6. An apparatus accoding to claim 5; wherein each thermal head segment has a plurality of heating elements disposed linearly therealong, the heating elements being effective to record data on the recording medium according to image bit data and being ineffective to record data on the recording medium according to blank bit data; and the compensating means comprises means for designating effective and ineffective ones of the heating elements of the thermal head segments according to the extent of overlap of the thermal head segments.

7. An apparatus according to claim 6; wherein the means for designating includes input means for manually inputting command data representative of the extent of overlap and shifting means for shifting the designation of effective and ineffective heating elements in accordandce with the command data.

8. An apparatus according to claim 6; wherein the compensating means includes means for compensating for linear thermal expansion of the thermal head segments during use of the apparatus.

9. An apparatus according to claim 8; wherein the means for compensating for linear thermal expansion comprises detecting means for detecting the body temperature of the thermal head segments, calculating means for calculating the relative extent of overlap due to linear thermal expansion of the thermal head segments according to the detected body temperature thereof, and shifting means for shifting the designation of effective and ineffective heating elements in accordance with the calculation result.

10. An apparatus according to claim 5; wherein the compensating means includes means for compensating for linear thermal expansion of the thermal head segments during use of the apparatus.

* * * * *